Patented Aug. 5, 1947

2,425,221

UNITED STATES PATENT OFFICE 2,425,221

PRODUCTION OF AMIDINE SALTS

Harry James Barber, Gidea Park, Romford, England, assignor to May & Baker Limited, Dagenham, England, a British company No Drawing. Application August 27, 1943, Serial No. 500,293. In Great Britain July 27, 1942

Section 1, Public Law 690, August 8, 1946.
Patent expires July 27, 1962

8 Claims. (Cl. 260—501)

This invention is for improvements in or relating to the preparation of amidine salts, especially salts of diamidines of the aromatic series.

The most commonly known amidine salts, the hydrochlorides, have usually been prepared by treating the corresponding nitrile with anhydrous alcoholic hydrochloric acid to form the corresponding imino-ether hydrochloride which has then been converted into the amidine hydrochloride by treatment with ammonia. In the case, for example, of the di-hydrochlorides of diamidines, especially diamidines of the aromatic series, it was found necessary to employ large excess quantities of anhydrous hydrochloric acid in order to cause the conversion of the nitrile into imino-ether hydrochloride to proceed at a reasonable speed and to completion. This frequently led to difficulties as it was necessary to remove at least the greater part of the excess of acid in order satisfactorily to carry out the next stage (conversion of imino-ether hydrochloride into amidine hydrochloride). Thus, when the conversion of nitrile to imino-ether hydrochloride was carried out in a diluent, and this hydrochloride did not separate, it was necessary to pump off considerable quantities of hydrochloric acid gas, which is objectionable for industrial scale operation.

Even when the imino-ether hydrochloride did separate, it often contained considerable quantities of free hydrochloric acid which was removable but slowly. For this reason and since also these imino-ether hydrochlorides are unstable, being decomposed by alcohol, it has been necessary to use a considerable excess of anhydrous alcoholic ammonia (e. g., 10 molecules of ammonia for each imino-ether group) for the step of converting the imino-ether hydrochlrides into the corresponding amidine hydrochlorides.

The production of other amidine salts than the hydrochlorides has involved the same difficulties since these other salts have hitherto been prepared either directly from the hydrochloride or from the amidine base, itself prepared from the hydrochloride.

It has now been discovered that the foregoing disadvantages are avoided if, instead of converting the imino-ether hydrochlorides directly into the corresponding diamidine hydrochlorides, the imino-ether hydrochlorides are converted into the corresponding imino-ether bases and the latter then treated with an ammonium salt. By working in this way, it is possible to obtain not only amidine hydrochlorides but also any other desired amidine salt. The imino-ether bases are more stable than their hydrochlorides and in many cases are well-defined, crystalline substances which may be re-crystallised from a number of organic solvents.

The process of the present invention for the production of amidine salts of an acid therefore comprises causing reaction between an iminoether base (corresponding to the amidine) and an ammonium salt of the said acid thereby to produce the amidine salt of the said acid.

It should be understood that the expression "imino-ether base corresponding to the amidine" as used in this specification and in the appended claims includes any imino ether having the formula of the amidine in question in which the amidine radical —C(=NH)NH$_2$ is replaced by the imino-ether radical —(C=NH)OR where R is any desired substituent for example a methyl, ethyl or β-phenylethyl radical.

This process is particularly applicable to the production of salts of aromatic diamidines having the general formula Am.B.X.B.Am wherein Am represents the amidine group, B represents an aromatic nucleus and X represents: (a) a direct linkage, or (b) an alkane chain (CH$_2$)$_n$ where $n$ is an integer from 1 to 12 in which one or more of the CH$_2$ groups may be replaced by an oxygen or sulphur group or an NH group, or (c) a —CR$_1$=CR$_2$— group in which R$_1$ and R$_2$ may be the same or different and represent hydrogen atoms or alkyl, aralkyl or aryl groups. Diamidines of this type are described in United States Patents Nos. 2,277,861, 2,277,862 and 2,204,983 and application S. No. 426,603.

The imino-ether bases employed as starting material may be obtained from their hydrochlorides (prepared in conventional manner). Thus, for example, the crude imino-ether hydrochlorides of the class corresponding to the aromatic diamidines having the foregoing general formula can be readily converted to the free imino-ether bases by suspending them in an inert solvent (chloroform is particularly suitable) and then adding, with good stirring and adequate cooling, e. g., by the addition of crushed ice, sufficient aqueous caustic soda solution to make the reaction mixture alkaline to phenolphthalein. The free base liberated, rapidly dissolves in the chloroform layer, which is separated from the aqueous layer and is thereafter washed and dried. The free bases obtained on evaporation of the chloroform are, in many cases, well-defined crystalline substances, which may be recrystallised from a number of organc solvents, of which benzene has been found most generally suitable.

It is not, however, essential to isolate the imino-ether hydrochloride (even in the crude state) before converting it into the imino-ether base. Thus, the imino-ether base can be obtained from the reaction mixture resulting from the usual process of preparing the hydrochloride (i. e., by saturating a solution or suspension of the nitrile, containing an anhydrous alcohol, with dry hydrochloric acid gas, and allowing to stand for the time required to complete the reaction) by treating this reaction mixture in the manner described above for the crude imino-ether hydrochloride. When, as is sometimes the case, the said anhydrous alcohol is employed in conjunction with an inert solvent, such as chloroform, the imino-ether base can be obtained from the reaction mixture simply by adding, with good stirring, a considerable excess of aqueous caustic soda solution, with cooling by addition of crushed ice. The separation of the free base is effected in the manner described above.

In carrying the present invention into effect, the imino-ether base obtained in the manner described above may be converted to any amidine salt by treatment with an appropriate ammonium salt, preferably in a suitable solvent medium. It has been found that the reaction can be carried out quite smoothly in aqueous alcoholic solution or suspension.

Suitable imino-ethers are, for example, those corresponding to the imino-ether hydrochlorides specified in United States Patents Nos. 2,277,861, 2,277,862 and 2,204,983 and application S. No. 426,603. The ammonium salt employed, is, of course, that corresponding to the amidine salt desired. Typical examples are ammonium chloride, ammonium β-hydroxy-ethane sulphonate, ammonium β-hydroxy-propane sulphonate, ammonium lactate and ammonium methane sulphonate.

It is convenient to dissolve the ammonium salt of the acid in water and the imino-ether base in an alcohol such as ethyl alcohol, the proportions of each being so adjusted that both components remain in solution after mixing at about 50° to 60° C. The amidine salt may or may not separate from the reaction mixture after some four or five hours, according to the solubility of the amidine salt. If it is soluble, it is convenient to concentrate to an appropriate degree and to crystallise by the addition of excess alcohol or acetone. The temperature range of 50° to 80° C. is preferred in practice but lower temperatures may also be used. Care should be taken to avoid substantially higher temperatures, i. e., up to boiling point such as would result in the loss from the reaction mixture of any substantial amount of ammonia required for the reaction.

A modification of the process hereinbefore defined and which is within the scope of this invention comprises reacting the imino-ether base with a salt of an organic base. Salts of primary or secondary amines can be employed, for example ethylamine lactate and piperidine hydrochloride.

An important advantage of the present invention lies in its applicability to the production of any amidine salt, whereas procedures hitherto described have yielded only the hydrochlorides from which the other salts have had to be prepared. Moreover, as has already been pointed out, the production of amidine hydrochlorides by the process of the present invention results in the elimination of disadvantages hitherto experienced.

The process of the present invention is illustrated by the following examples:

*Example I*

1.5 kilos of finely powdered 4:4′-dicyanostilbene were suspended in 5 litres of absolute ethyl alcohol and dry hydrogen chloride was passed in until the mixture had become saturated at 0° C. About 3.3 kilos were taken up in this way. The mixture was then stirred for 3 weeks at 25–30° C. in a sealed pressure vessel. The crude di-imino-ether di-hydrochloride produced was then filtered and the product, still containing a considerable excess of hydrochloric acid, was suspended in 4 litres of chloroform. 2 kilos of well crushed ice were added and aqueous sodium hydroxide solution run in until the reaction mixture became permanently strongly alkaline to phenolphthalein. The temperature was not permitted to rise above about 25° C., the temperature being controlled by the addition of more ice as and when required. The mixture was stirred until all the yellow di-imino-ether di-hydrochloride had disappeared and all the base was in solution in the chloroform. After the mixture had been filtered from traces of unchanged dicyanostilbene, the chloroform layer was separated, washed with water, dried and then distilled. The residual crude di-imino-ether base was crystallised from 6–7 volumes of dry benzene. It forms pale yellow prisms M. P. 139–140° C.

5.25 kilos of di-imino-ether base obtained in the manner described above were suspended in 12.6 litres of ethyl alcohol and a solution of 4.9 kilos of ammonium β-hydroxy-ethane sulphonate in 6.3 litres of water at 60° C. was added. The mixture was stirred for 4 hours at 70–80° C. The resulting solution was treated with charcoal and filtered and the product, trans-stilbene-4:4′-bis (carbonamidine)-di-β-hydroxyethane sulphonate obtained by adding the solution to 84 litres of ethyl alcohol. It was identical with that described in United States patent application S. No. 438,612.

*Example II*

A solution of 7.65 grams ethylamine lactate in 25 ccs. of water was added to a mixture of 8.6 grams trans-stilbene-4:4′-bis-(carbon-imino-ethyl ether) in 50 ccs. of ethyl alcohol. The mixture was kept at 65°–70° C. for 15 hours with occasional shaking, then boiled with charcoal, filtered and treated with 600 ccs. acetone. The precipitate was filtered, and washed with acetone, and taken up in cold ethyl alcohol. The solution was stirred with charcoal and filtered, and treated with excess acetone. The trans-stilbene-4:4′-bis (N-ethyl-carbonamidine) di-lactate was filtered, washed with acetone, and dried in vacuo.

*Example III*

A solution of 7.0 grams ammonium lactate in 30 ccs. of water was added to a mixture of 10.0 grams of trans-stilbene-4:4′-bis(carbonimino-ethyl ether) in 60 ccs. of ethyl alcohol. The mixture was kept at 60°–65° C. for 17 hours, then made acid to litmus with lactic acid and boiled with 300 ccs. of water, treated with charcoal, and filtered hot. After standing for some hours the cold solution was again filtered, and the filtrate treated with 5 volumes of acetone. The trans-stilbene-4:4′-bis(carbonamidine) di-lactate was filtered, washed with acetone and dried in vacuo.

*Example IV*

A solution of 0.4 gram of ammonium chloride in 8 ccs. of water was added to a solution of 1.0 gram of trans-alpha:beta-dimethyl-stilbene-4:4'-bis (carbonimino ethyl ether) in 20 ccs. of ethyl alcohol. The mixture was kept at 70° C. for 3 hours and then allowed to stand over night at room temperature. After treating the solution with acetone, the separated solid was filtered, washed with acetone and recrystallised by dissolving in 20 ccs. of warm water, filtering and adding 15 ccs. of concentrated hydrochloric acid. The yellow trans-alpha-beta-dimethyl-stilbene-4:4'-bis(carbonamidine) dihydrochloride crystallised on cooling.

*Example V*

A solution of 5.1 grams of piperidine hydrochloride in 25 ccs. of water was added to a mixture of 6.45 grams of trans-stilbene-4:4'-bis(carbonimino ethyl ether) in 30 ccs. of ethyl alcohol. The mixture was kept at 60° C.–65° C. for 3 hours, treated with charcoal and filtered while hot. The solution was then diluted with acetone, the precipitate filtered, washed with acetone and purified by crystallisation from dilute hydrochloric acid. The trans-stilbene-4:4'-bis(N-piperidine carbonamidine) dihydrochloride separated in a hydrated form and, after filtration, was dried in vacuo.

*Example VI*

A solution of 0.35 gram of ammonium chloride in 2 ccs. of water was added to a solution of 1.0 gram of trans-beta-ethyl-stilbene-4:4'-bis(carbonimino ethyl ether) in 10 ccs. of ethyl alcohol. After heating at 50° C. for 5 hours the mixture was left overnight at room temperature. The solid produced by precipitation with acetone was filtered and purified by recrystallisation from a mixture of ethyl alcohol and acetone. The resulting white platelets of trans-alpha-ethyl stilbene-4:4'-bis(carbonamidine) dihydrochloride were dried in vacuo.

*Example VII*

27.4 grams of trans-stilbene-4:4'-bis(carbon-iminomethyl ether) and 28 grams of ammonium isethionate were suspended in a mixture of 70 ccs. of ethyl alcohol and 35 ccs. of water. The mixture was heated at 55–65° C. for 5 hours. The product was isolated and purified.

What I claim and desire to secure by Letters Patent is:

1. Process for the production of a salt of a symmetrical aromatic diamidine, which comprises reacting a symmetrical di-imino-ether base of the formula

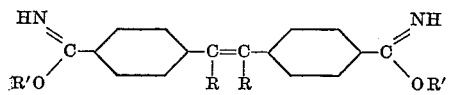

in which R is selected from the group consisting of hydrogen and a lower alkyl radical and in which R' is a lower alkyl radical, with an ammonium salt of an acid, in an aqueous alcoholic medium, and isolating the resulting salt from the reaction mixture.

2. Process according to claim 1 wherein the reaction is conducted at an elevated temperature below that at which any substantial quantity of ammonia is evolved from the reaction mixture.

3. Process according to claim 1 wherein both the ammonium salt of an acid and the di-imino-ether base are soluble in the said medium, and the reaction is conducted at a temperature between 50° and 80° C.

4. Process according to claim 1 wherein the medium is an aqueous alcoholic suspension, and the reaction is conducted at a temperature between 50° and 80° C.

5. Process according to claim 1 wherein the ammonium salt of an acid is dissolved in water and the di-imino-ether base is dissolved in an alcohol, the proportions of each being so adjusted that both components remain in solution on the solutions being mixed together at about 50° to 80° C., and thereafter mixing together the two solutions at a temperature within this range.

6. Process for the production of trans-stilbene-4:4'-bis(carbonamidine)-di-beta-hydroxyethane sulphonate which comprises reacting, in an aqueous alcoholic medium, ammonium beta-hydroxyethane sulphonate with trans-stilbene-4:4'-bis-(carboniminoethyl ether), and isolating the said diamidine salt from the reaction mixture.

7. Process for the production of trans-stilbene-4:4'-bis(carbonamidine) di-lactate which comprises reacting, in an aqueous alcoholic medium, ammonium lactate with trans-stilbene-4:4'-bis-(carbon-iminoethyl ether), and isolating the said diamidine salt from the reaction mixture.

8. Process for the production of trans-alpha:beta-dimethyl-stilbene-4:4'-bis(carbonamidine)-dihydrochloride which comprises reacting, in an aqueous alcoholic medium, ammonium chloride with trans-alpha:beta-dimethyl-stilbene-4:4'-bis(carbon-iminoethyl ether), and isolating the said diamidine salt from the reaction mixture.

HARRY JAMES BARBER.

REFERENCES CITED

The following references are of record in the file of this patent:

UNITED STATES PATENTS

| Number | Name | Date |
|---|---|---|
| 2,204,983 | Ewins | June 18, 1940 |
| 2,277,861 | Ewins et al. | Mar. 31, 1942 |
| 2,277,862 | Ewins et al. | Mar. 31, 1942 |

FOREIGN PATENTS

| Number | Country | Date |
|---|---|---|
| 116,718 | Australia | Mar. 12, 1943 |
| 559,015 | Great Britain | Feb. 1, 1944 |

OTHER REFERENCES

Beilstein, Handbuch der Org. Chem., IV ed., vol. IX, p. 271.
Beilstein, Handbuch der Org. Chem., IV ed., vol. IX Suppl., p. 121.